United States Patent [19]

DeLuca

[11] 3,881,902
[45] May 6, 1975

[54] APPARATUS FOR TREATING GLASS OPTICAL WAVEGUIDE FIBERS

[75] Inventor: Robert D. DeLuca, Big Flats, N.Y.

[73] Assignee: Corning Glass Works, Corning, N.Y.

[22] Filed: Sept. 20, 1973

[21] Appl. No.: 399,089

Related U.S. Application Data

[62] Division of Ser. No. 215,319, Jan. 4, 1972, Pat. No. 3,788,827.

[52] U.S. Cl. .................. 65/12; 65/157; 65/181; 65/DIG. 4
[51] Int. Cl. ............................................. C03b 25/00
[58] Field of Search ............ 65/32, 157, 12, DIG. 4, 65/181

[56] References Cited
UNITED STATES PATENTS

| | | | |
|---|---|---|---|
| 2,958,899 | 11/1960 | Stein et al. | 65/157 X |
| 3,450,581 | 6/1969 | Shortes | 64/DIG. 4 |
| 3,502,456 | 3/1970 | Fetner | 65/32 |
| 3,574,584 | 4/1971 | Girard et al. | 65/32 X |
| 3,741,739 | 6/1973 | Baker | 65/32 X |
| 3,837,824 | 9/1974 | Siegmund | 65/32 X |

*Primary Examiner*—S. Leon Bashore
*Assistant Examiner*—Frank W. Miga
*Attorney, Agent, or Firm*—William J. Simmons, Jr.; Walter S. Zebrowski; Clarence R. Patty, Jr.

[57] ABSTRACT

Apparatus for removing contaminants from the surface of a glass optical waveguide fiber and thereafter treating the fiber while preventing the surface from being recontaminated. Contaminants are removed from the surface by subjecting the waveguide to means for bombarding the surface thereof with ions having sufficient energy to remove a surface layer from the fiber. The cleaned fiber may be immediately heat treated to improve the light transmission properties thereof, or it may be coated to prevent recontamination of the surface prior to heat treatment to which the coated fiber may thereafter be subjected.

18 Claims, 7 Drawing Figures

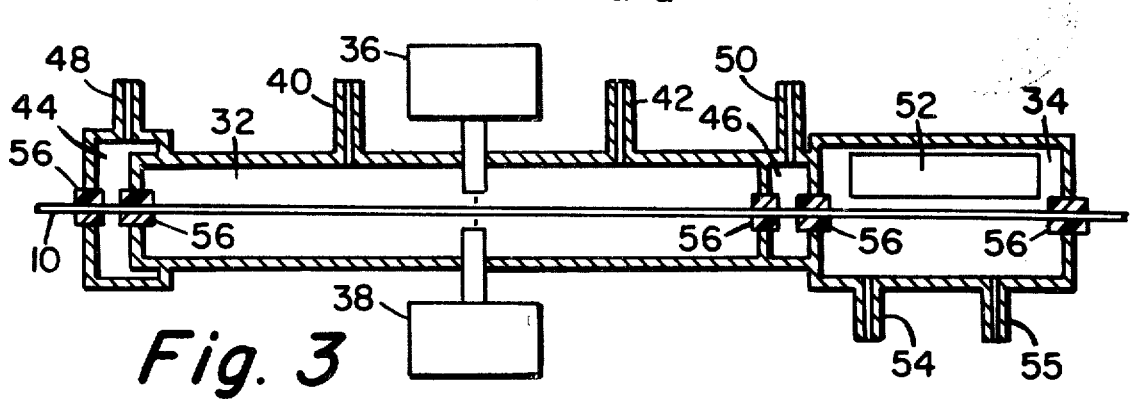
Fig. 3
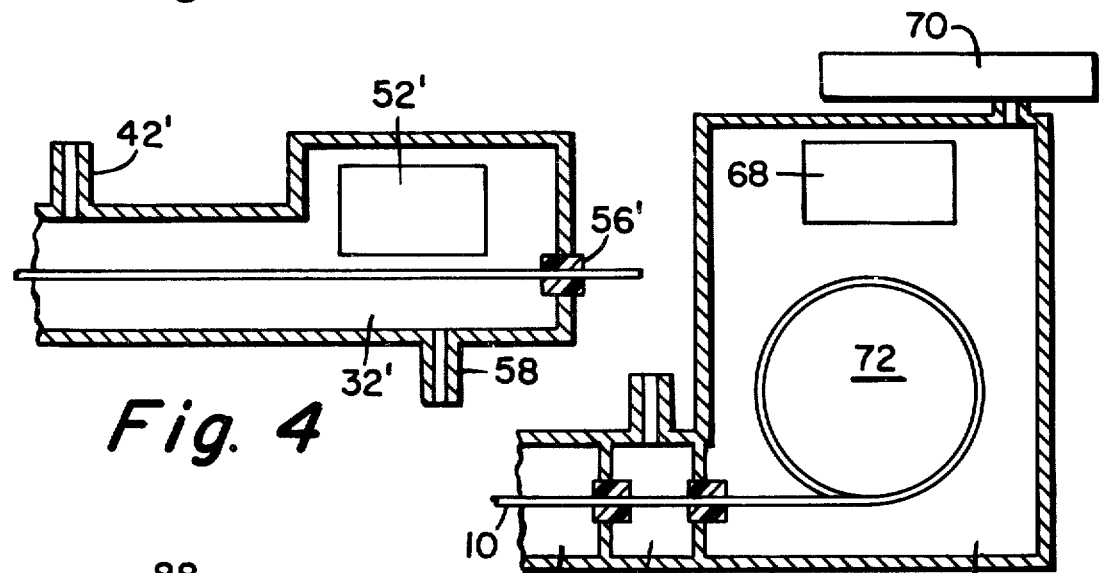
Fig. 4
Fig. 5
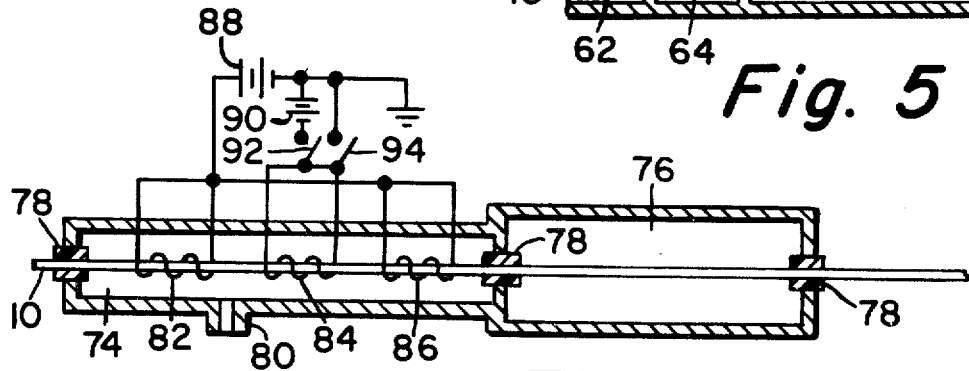
Fig. 6
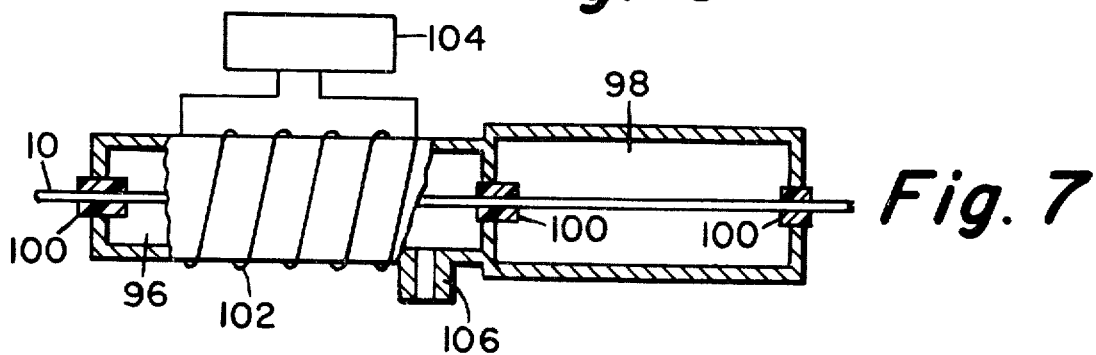
Fig. 7

APPARATUS FOR TREATING GLASS OPTICAL WAVEGUIDE FIBERS

CROSS-REFERENCE TO RELATED APPLICATION

This is a division of application Ser. No. 215,319 filed on Jan. 4, 1972 now U.S. Pat. No. 3,788,827.

BACKGROUND OF THE INVENTION

The continually increasing amount of traffic that communication systems are required to handle has forced the development of high capacity systems. Even with the increased capacity made available by systems operating between $10^9$ Hz and $10^{12}$ Hz, traffic growth is so rapid that saturation of such systems is anticipated in the very near future. Higher capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at frequencies around $10^{15}$ Hz.

Producing a satisfactory transmitting media for frequencies around $10^{15}$ Hz has been one of the more difficult problems in the development of an effective optical communication system. Such transmitting media are hereinafter referred to as "optical waveguides." To be an effective transmitting media for an optical communication system an optical waveguide should transmit light without excessive attenuation and should not cause dispersion or scattering of the transmitted light. In addition, an optical waveguide should allow only preselected modes of light propagation.

A very thorough and complete discussion concerning the operational theories of optical waveguides is contained in U.S. Pat. No. 3,157,726 issued to Hicks et al. and in the publication "Cylindrical Dielectric Waveguide Mode" by E. Snitzer, *Journal of the Optical Society of America*, Vol. 51, No. 5, pages 491–498, May, 1961. Another excellent source of information concerning optical waveguides is *Fiber Optics - Principles and Applications* by N. S. Kapany, Academic Press, 1967.

Optical waveguides are a unique type of optical fiber in that many of the physical characteristics and parameters must be carefully coordinated. In the conventional optical fiber substantially all of the transmitted light is retained within the core. In order to prevent transmitted light from escaping the fiber, one of the more basic considerations in producing conventional optical fibers is that the index of refraction of the core be larger than the index of refraction of the cladding layer. In fact, if the difference between the two indices of refraction is increased, the amount of light escaping from the fiber will decrease. Therefore, it is common practice in the production of conventional fibers to make the difference between the two indices of refraction as large as possible. However, if an optical fiber is to function as an optical waveguide wherein the transmitted light is limited to one or more preselected modes, the diameter of the core, the index of refraction of the core and the index of refraction of the cladding layer must be carefully coordinated. The relationship between these parameters is such that if the difference between the indices of refraction of the core and cladding increases, the core radius must decrease. Producing optical waveguides having core and cladding indices of refraction within limits necessary to maintain single mode propagation is difficult even for waveguides with very small diameter cores. The difference between the indices of refraction of core and cladding glasses is slightly greater for multimode optical waveguides, the core radius being constant. The difficulty of providing the proper difference in refractive indices is markedly increased in the production of waveguides with larger cores. As an example, if a single mode optical waveguide is to have a small core, e.g., a core diameter of approximately 1 micron, the required difference in the two indices of refraction will be on the order of 0.01, and if the optical waveguide is to have a large core, e.g., a core diameter of approximately 1 millimeter, the required difference in the two indices of refraction would be on the order of 0.0001. The difficulty of very accurately controlling the diameter of the core, the index of refraction of the core and the index of refraction of the cladding layer has made the development of good quality optical waveguides very difficult.

Optical waveguides having very small differences between the indices of refraction of the core and cladding materials have been achieved by utilizing as the cladding material a very low loss optical glass and providing a core of the same material which has been doped to slightly increase the index of refraction. A method of forming an optical waveguide of this type is disclosed in U.S. Pat. No. 3,711,262 entitled "Method of Producing Optical Waveguide Fibers." That patent teaches a method of forming a waveguide comprising a cladding of optical quality glass such as fused silica and a core of the same optical quality glass that has been doped with a suitable material such as titanium oxide, tantalum oxide, tin oxide, niobium oxide, zirconium oxide, aluminum oxide or the like. During the process of drawing an optical waveguide fiber from a glass body of larger cross-sectional area, the high temperature to which the glass body is subjected causes reduction of some of the dopant oxide to form impurities which cause absorption losses, thereby increasing attenuation losses to intolerable levels. However, after optical waveguide fibers are drawn, the light absorption properties thereof can be reduced by heat treating them in an oxygen atmosphere. Although such post-drawing heat treatments have resulted in fibers having low absorption losses, they also have the detrimental effect of severally weakening the fibers.

SUMMARY OF THE INVENTION

It is therefore an object of the present invention to provide an apparatus for forming strong glass optical waveguide fibers having good light transmission properties.

Briefly, the present invention relates to an apparatus for treating a glass optical waveguide fiber which has been subjected to a contaminating atmosphere such as air after it has been drawn. This invention is especially useful for forming strong glass optical waveguides from fibers of the type which must be subjected to post-drawing heat treatment to increase the light transmission properties thereof to an acceptable level. The apparatus comprises a first chamber having openings in opposing ends thereof through which the fiber is adapted to pass. Gaseous discharge means provides the first chamber with ions that bombard the surface of the fiber and remove a portion thereof. The first chamber is provided with a controlled atmosphere that is determined by the particular type of gaseous discharge means that is employed. Means are also provided for treating the cleaned fiber before the surface thereof can become recontaminated.

BRIEF DESCRIPTION OF THE DRAWINGS

FIG. 3 is a cross-sectional view of an embodiment similar to that shown in FIG. 2 wherein means are provided for coating a cleaned fiber.

FIG. 4 is a cross-sectional view of a fiber treating apparatus wherein fiber coating means is disposed in the chamber in which the fiber is cleaned.

FIG. 5 is a cross-sectional view of an apparatus for heat treating a fiber after it has been cleaned.

FIG. 6 is a cross-sectional view of an apparatus for cleaning a fiber by a corona discharge induced plasma.

FIG. 7 is a cross-sectional view of an apparatus for cleaning a fiber with a radio frequency induced plasma.

DETAILED DESCRIPTION OF THE INVENTION

Figures 1, 2:
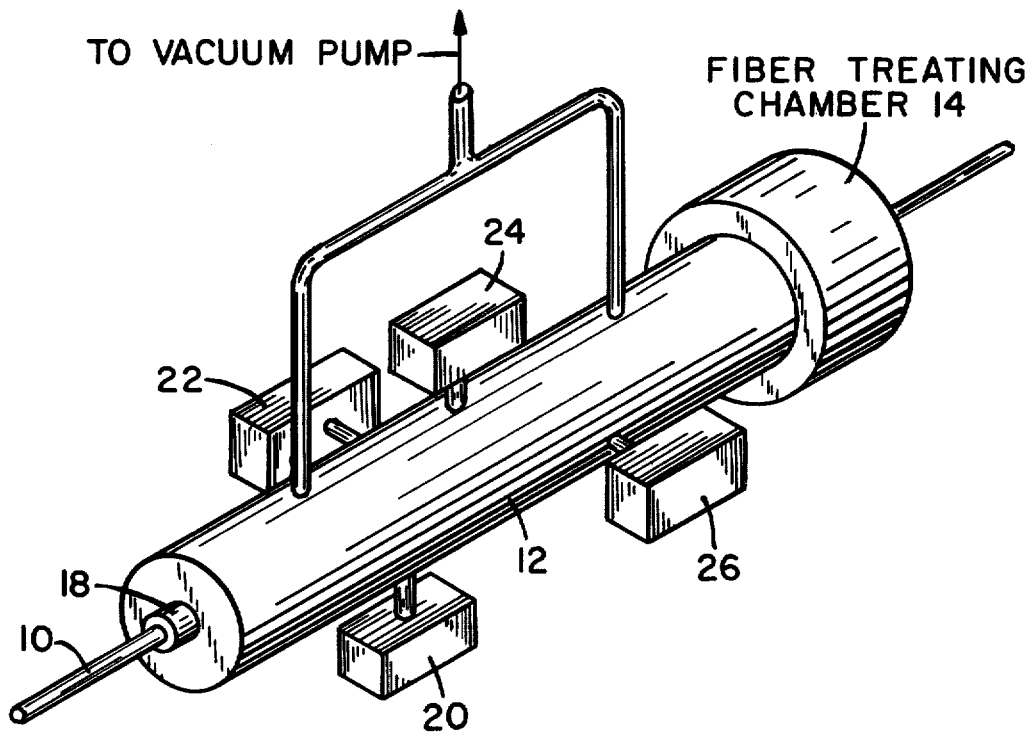
FIG. 1 broadly depicts the method steps of the present invention.
FIG. 2 is an oblique view of a first embodiment of the present invention wherein a plurality of sources of dense, focused high energy ion beams are helically arranged about a fiber cleaning chamber.

The present invention relates to an apparatus which is especially useful in the treatment of glass optical waveguide fibers of the type which must be subjected to post-drawing heat treatment to reduce light absorption losses to a level that is acceptable for optical communication systems. The diagram of FIG. 1 depicts broadly the steps performed by the apparatus of the present invention. As illustrated in this figure, some glass optical waveguide fibers possess high absorption losses as a result of the reduction of certain metal ocides in the oxides during the redrawing of the fiber at high temperatures. Although the light transmission properties of the waveguide are improved, post-drawing heat treatment has heretofore had the detrimental effect of severely weakening the optical waveguide fibers. Because of the need for this heat treatment, it seemed likely that such a fiber could not be used in a communication system requiring long lengths of optical waveguide fibers. It has been found that the decrease in fiber strength to intolerable levels is brought about by heating a fiber when the surface thereof is contaminated by such impurities as water, hydroxyl ions, alkali ions and the like. In accordance with the present invention at least some of these impurities are removed from the surface of a fiber and recontamination of the surface is prevented at least until the fiber is heat treated to reduce absorption losses. This step, which is described in FIG. 1 as "Removal of Surface Contamination from Fiber," is performed in a sputtering chamber having a controlled atmosphere that is suitable for the particular type of sputtering or ion bombardment that is utilized in the chamber. Eleven different ion sources are described on pages 423–430 of "Ion Bombardment of Solids" by G. Carter et al., American Elsevier Publishing Co. Inc., New York, N.Y., 1968. The ion sources described therein require a controlled atmosphere such as a high vacuum, reduced air pressure or an ionizable gas. Three of the ion sources described in the aforementioned text are described herein as being exemplary embodiments of the sputtering apparatus which may be employed in the present invention. In the sputtering chamber the surface of the fiber is bombarded with ions having sufficient energy to remove a surface layer from the fiber, thereby also removing surface contaminants, and any ion source capable of performing this function can be employed in the apparatus of the present invention.

FIG. 1 also depicts an optional step entitled "Coating Fiber to Prevent Recontamination of Surface." This step need not be performed if the fiber from which surface contamination has been removed is heat treated before the fiber is permitted to enter a contaminating atmosphere. Finally, the fiber is subjected to a step entitled "Heat Treating Fiber Having Noncontaminated Surface to Reduce Absorption Losses." Since the surface of the fiber is free from contamination during the high temperature treatment to which it is subjected, the heat treated fiber is not weakened, and the resultant fiber has the required strength and light transmission properties to be utilized in optical communication systems.

In order to fully appreciate the nature of the forementioned type of glass optical waveguide fibers to which the present invention relates, the initial steps in the fabrication of a fused silica optical waveguide will first be described, since this type of waveguide is exemplary of those which require heat treatment to reduce absorption losses. However, the present invention relates to apparatus for treating any silicate glass optical waveguide. A hole is drilled in a rod of fused silica and the surface on the inside wall of the tube is polished. In accordance with the teachings of the aforementioned U.S. Pat. No. 3,711,262, a film of fused silica doped with titanium oxide is then applied to the inside wall of the tube by a flame hydrolysis process. This film may consist of 94.75 percent fused silica and 5.25 percent titanium oxide. The dimensions of the fused silica tube and the thickness of the film are determined by the desired dimensions of the resultant optical waveguide. The composite structure is heated at approximately 1450°C until the deposited film sinters, thereby resulting in a thin film of titanium oxide doped fused silica bonded to the inside wall of the tube. The composite structure is then further heated in an oxygen atmosphere until it reaches a temperature of about 1900°C at which the viscosity of the fused silica is low enough for drawing. The composite structure is then drawn to reduce the diameter thereof until the film of titanium oxide doped fused silica collapses, i.e., it seals the longitudinal hole in the fused silica tube to form a solid core surrounded by pure fused silica. The resulting composite rod is then further drawn to produce a fiber having a relatively thick cladding surrounding a small diameter solid core, the total diameter to core diameter preferably being in the range of 10:1 to 300:1.

At the high temperature needed to redraw the fibers, there is a strong tendency for the titanium to reduce, thereby increasing the absorption losses of the resultant waveguide. The light transmission properties of the waveguide are greatly improved by heat treating the waveguide in an oxygen atmosphere at a temperature between 500°C and 1,000°C for not less than 3 minutes. In accordance with the present invention contamination is removed from the surface of a fiber prior to heat treatment and the fiber is isolated from the ambient atmosphere at least until after heat treatment is completed.

FIG. 2 illustrates an apparatus which may be used in the formation of strong glass optical waveguide fibers. This apparatus includes a sputtering chamber 12 wherein a surface layer of the fiber is removed and fiber treating means 14, which is disposed immediately adjacent to chamber 12, wherein fiber 10 is heat treated to reduce dopant impurities in the core portion thereof or wherein the fiber is coated to prevent the further accumulation of deleterious contaminants on the surface thereof. In the latter case, fiber heat treatment may be carried out in a station immediately adjacent to the coating chamber, or the coated fiber can be stored on a reel while awaiting heat treatment. Removal of a surface layer by apparatus such as that illustrated in FIG. 2 is preferred over surface etching by wet chemicals since the latter method employs water which is harmful to silica and also requires the additional steps of rinsing and drying the etched fiber.

Fiber 10 passes through a vacuum-tight, nonabrasive bushing 18, one of which is disposed at each end of chamber 12. Bushing 18 may be made from any suitable material such as a plastic such as teflon, teflon coated glass, or the like.

Since glass is an insulator, it is not possible to apply a potential directly to fiber 10, a requisite condition for radio frequency sputtering. Therefore, the apparatus of the present invention must utilize ion sources such as duoplasmatrons which are capable of providing dense, focused high energy ion beams. In FIG. 2 four ion sources 20, 22, 24 and 26 are disposed along the surface of chamber 12 in a helical manner. A number of ion sources other than that illustrated could be helically disposed about chamber 12 or the ion sources could be radially disposed from a point within chamber 12 through which fiber 10 passes. The particular arrangement of ion sources is not critical, and other arrangements may occur to those skilled in the art. It is preferred that the ion sources be arranged so that a relatively uniform surface layer is removed from fiber 10 so that the waveguide remains circular in cross-section. Since ion sources such as the duoplasmatron source project into chamber 12 ions which bombard the surface of fiber 10, that portion of the chamber where this bombardment occurs is preferably evacuated to a pressure of about $10^{-7}$ Torr, although pressures around $10^{-4}$ Torr could be utilized. A vacuum pump with a throughput larger than the sum of the leaks through the ion source and end bushings should be sufficient to maintain this vacuum.

In the embodiment shown in FIG. 3 fiber 10 is first passed through sputtering chamber 32 where a surface layer thereof is removed in preparation for the application of a coating to the fiber in chamber 34. This embodiment differs from that of FIG. 2 in that ion sources 36 and 38 are disposed radially with respect to a point in the center of chamber 32 so that all portions along a given length of the fiber are simultaneously sputtered. The dashed lines extending between the ion sources 36 and 38 and the surface of fiber 10 are illustrative of the dense focused high energy ion beams emanating from the sources. Chamber 32 may be pumped to the required level of vacuum through pipes 40 and 42. Both ends of chamber 32 may be provided with vacuum chambers 44 and 46 which may be connected to a vacuum pump by pipes 48 and 50, respectively. The local high vacuum levels required for sputtering in chamber 32 may thus be provided by differential pumping.

Chamber 34 may contain means 52 for providing the sputtered fiber with a protective coating of plastic, silicone, metal or the like. A plastic such as nylon may be dissolved in a solvent and the resultant solution sprayed to create a fog through which the sputtered fiber passes. A silicone coating may be applied by passing the fiber through a silicone containing liquid. A coating of plastic or a hydrophobic metal can be sputtered onto the fiber by disposing energized cathodes of the desired material adjacent to the fiber and providing the appropriate inert gas containing atmosphere. A protective coating could be sputtered on the surface of the fiber at a pressure of about $10^{-3}$ or $10^{-4}$ Torr, and a silicone coating may also be applied in a low level vacuum. Chamber 34 is therefore provided with a pipe 54 which may be connected to a vacuum pump and a pipe 55 which may be connected to a source of inert gas. Since some coating methods do not require a vacuum or an inert gas atmosphere, an inert gas atmosphere could be provided by pipe 55 to prevent the fiber surface from becoming contaminated before the coating operation is completed. Although a single box is depicted in FIG. 3 to illustrate the fiber coating means, it is obvious that coating methods such as sputtering, spraying or the like may require multiple sources of coating material to adequately coat the entire surface of the fiber. Bushings 56 are provided in certain walls of chambers 32, 34, 44 and 46 to provide gas tight openings through which the fiber passes.

Fiber 10 is initially loaded into the system so that it passes through all of the bushings 56, and the vacuum pumps connected to pipes 40, 42, 48, 50 and 54 are then started. When the vacuum in chamber 32 is sufficiently high, operation of ion sources 36 and 38 is initiated, and the fiber is pulled through the system. Sputtering rates of several hundred Angstroms per second are possible with ion sources of the duoplasmatron type, so the fiber need reside in the ion beams for only a few seconds. The ionic bombardment creates broken atomic bonds, and the fiber thereby acquires a charge which enhances the bonding of the coating applied in chamber 34.

As illustrated in FIG. 4, wherein parts similar to those of FIG. 3 are designated by primed reference numerals, coating means 52' may be disposed in that end of chamber 32' through which the sputtered fiber passes. In this embodiment the fiber coating means would have to be of the type which operates in a vacuum due to the requirements of the ion sources. If necessary, one or more additional pipes such as pipe 58 may be connected to chamber 32' to provide the necessary vacuum.

FIG. 5 illustrates an apparatus for heat treating the sputtered fiber before it is subjected to a contaminating atmosphere. The sputtered fiber 10 passes through a chamber 62, which may be a sputtering chamber similar to chamber 32 of FIG. 3, a vacuum chamber 64 and then into a heat treating chamber 66 which contains heating means 68 capable of heating chamber 66 to a temperature between 500°C and 1,000°C. Source 70 provides chamber 66 with an oxygen containing atmosphere which is required for heat treatment. Since it may be desirable to heat treat fiber 10 after it has been sputtered and coated, chamber 62 of FIG. 5 may be a fiber coating chamber such as chamber 34 of FIG. 3 or chamber 32' of FIG. 4. Although chamber 64 of FIG. 5 and chambers 44 and 46 of FIG. 3 provide isolation between adjacent chambers and may assist the chamber which contains the ion sources to attain the desired level of vacuum, it is obvious that these chambers may be omitted. As fiber 10 enters chamber 66 it is stored on a reel 72. After a sufficient amount of fiber is stored, heating means 68 may be activated for a period of time sufficient to oxidize impurities in the fiber and improve the light transmission properties thereof to an acceptable level.

Surface contamination may also be removed from a fiber by a combination of ion and electron bombardment which occurs in a gaseous discharge. Two gaseous discharges which are especially suitable for cleaning glass optical waveguide fibers are corona and radio frequency induced plasmas which are generated by the devices illustrated in FIGS. 6 and 7, respectively. The ion and electron bombardment of a fiber which occurs in these discharges can remove contaminants by several mechanisms among which heating and ionization are the most prominent.

The corona or field ionization discharge chamber 74 of FIG. 6 has a fiber treating chamber 76 disposed adjacent to the end therof from which the cleaned fiber emerges. Gas tight, nonabrasive bushings 78 through which fiber 10 passes, are disposed at the ends of chambers 74 and 76. A pipe 80 supplies chamber 74 with a noncontaminating ionizable gas. Three high voltage coils which may be made of a metal such as tungsten, nichrome, copper or the like, are so disposed in chamber 74 that fiber 10 passes therethrough. Coils 82 and 86 are connected to a source 88 of high positive potential whereas coil 84 may be connected to a source 90 of high negative potential by switch 92, or it may be connected to ground by switch 94. As fiber 10 moves through coil 86 it acquires a charge which remains thereon since the fiber is an insulator. Such a charge can be useful in the application of a coating to the fiber. The arrangement of coils and voltages illustrated in this figure is not critical. More or less than the number of coils illustrated could be utilized and the positive and negative voltage sources could be interchanged so that the first coil through which the fiber passes could be connected to a negative source of potential. The potential supplied by sources 88 and 90 must be sufficient to create a corona charge layer, approximately 5 kv being sufficient. The diameter of the coils must be such that the fiber surface is located in the corona charge layer. Since the fiber is an insulator, its surface will charge up to the potential of the coil through which it is passing, thereby preventing further ion or electron bombardment. A reversal of the field is employed to assist in cleaning as well as removing the surface charge. Thus the fiber is made to pass through adjacent coils which are at equal and opposite polarity potentials, or alternate coils may be grounded. Depending on the length of each coil and the number of coils utilized, some heating of the fiber will occur, but the primary cleaning mechanism of this kind of discharge is electrostatic ionization.

An example of an apparatus for cleaning the surface of fiber by radio frequency induced plasma is illustrated in FIG. 7. The fiber 10 first passes through the cleaning chamber 96 and is subsequently treated in a chamber 98. As in previous embodiments, fiber 10 enters and leaves the chambers by way of bushings 100. In this embodiment a reduced pressure is necessary to sustain a discharge which is produced by induction from a coil 102 to which a radio frequency signal is applied from source 104. The radio frequency discharge cleans the fiber 10 by both heating and ionization. In this type of system the discharge-freed contaminants are removed from the vicinity of the fiber by the vacuum system which is connected to chamber 96 by one or more pipes 106.

After contaminants are removed from the fiber surface by subjecting it to a plasma induced by the devices illustrated in FIGS. 6 and 7, the fiber may be treated in accordance with the methods described in conjunction with FIGS. 3 through 5.

I claim:

1. Apparatus for treating a glass optical waveguide fiber comprising
   a first chamber having fiber input and output openings in opposing ends thereof, said fiber being adapted to pass through said fiber input opening into said chamber and thereafter pass from said chamber through said fiber output opening,
   means for providing said first chamber with a first controlled atmosphere,
   means for providing a gaseous discharge in said first chamber to remove surface contaminants from said fiber, and
   means disposed at said fiber output opening for treating said fiber before the surface thereof can become recontaminated.

2. Apparatus in accordance with claim 1 wherein said means for providing a gaseous discharge comprises means for bombarding the surface of said fiber with ions having sufficient energy to remove a surface layer of said fiber.

3. Apparatus in accordance with claim 2 wherein said means for bombarding comprises a plurality of ion sources for directing dense, focused high energy ion beams at the surface of said fiber and said means for providing a first controlled atmosphere comprises means for providing in the vicinity of said ion beams a pressure of $10^{-4}$ Torr or lower.

4. Apparatus in accordance with claim 3 wherein said ion sources are disposed helically with respect to the axis of said first chamber along which said fiber is adapted to pass.

5. Apparatus in accordance with claim 3 wherein said ion sources are disposed radially with respect to the axis of said first chamber along which said fiber is adapted to pass.

6. Apparatus in accordance with claim 3 wherein said means for treating is disposed in said evacuated chamber adjacent to that end from which said fiber is adapted to emerge.

7. Apparatus in accordance with claim 6 wherein said means for treating comprises means for sputtering a protective coating onto the surface of said fiber.

8. Apparatus in accordance with claim 3 wherein said means for treating comprises a second chamber having a second controlled atmosphere for preventing the surface of said fiber from becoming recontaminated, said apparatus further comprising means connecting said first and second chambers for preventing said fiber from becoming recontaminated during its movement from said first chamber to said second chamber.

9. Apparatus in accordance with claim 8 further comprising means in said second chamber for applying a protective coating to the surface of said fiber to prevent recontamination of the surface of said fiber.

10. Apparatus in accordance with claim 8 further comprising means in said second chamber for heating said fiber to a temperature between 500°C and 1,000°C to enhance the light transmission properties thereof.

11. Apparatus in accordance with claim 1 wherein said means for providing a gaseous discharge comprises at least one conductive coil surrounding and closely spaced from said fiber and means for energizing said at least one coil with a dc voltage which is sufficient to create a corona charge layer through which the surface of said fiber passes, said means for providing a controlled atmosphere providing said first chamber with a noncontaminating ionizable gas.

12. Apparatus in accordance with claim 11 wherein said means for providing a gaseous discharge comprises at least two conductive coils surrounding and closely spaced from the surface of said fiber, means for applying dc voltages of differing values to each of the conductive coils.

13. Apparatus in accordance with claim 1 wherein said means for providing a gaseous discharge comprises a conductive coil surrounding said first chamber, and a source of rf energy connected to said coil, said means for providing a controlled atmosphere comprising means for supplying said first chamber with a gas which ionizes under the influence of the rf energy provided by said coil.

14. Apparatus in accordance with claim 13 wherein said means for treating comprises a second chamber having a second controlled atmosphere for preventing the surface of said fiber from becoming recontaminated, said apparatus further comprising means connecting said first and second chambers for preventing said fiber from becoming recontaminated during its movement from said first chamber to said second chamber.

15. Apparatus in accordance with claim 14 further comprising means in said second chamber for applying a protective coating to the surface of said fiber to prevent recontamination of the surface of said fiber.

16. Apparatus in accordance with claim 14 further comprising means in said second chamber for heating said fiber to a temperature between 500°C and 1,000°C for at least 3 minutes to increase the light transmission properties thereof.

17. Apparatus in accordance with claim 1 wherein said means for treating comprises means for applying a protective coating to the surface of said fiber to prevent recontamination of the surface of said fiber.

18. Apparatus in accordance with claim 1 wherein said means for treating comprises means for heating said fiber to a temperature between 500°C and 1,000°C for at least 3 minutes to enhance the light transmission properties thereof.

* * * * *